United States Patent [19]
Alaska

[11] 3,815,997
[45] June 11, 1974

[54] PHOTO PRISMATIQUE POLARISCOPE
[76] Inventor: St. Barth Alaska, 3811 S. Scouville Ave., Berwyn, Ill. 60402
[22] Filed: Oct. 2, 1972
[21] Appl. No.: 294,480

[52] U.S. Cl. ............... 356/114, 356/33, 350/160 P
[51] Int. Cl. .......................................... G01n 21/40
[58] Field of Search ......... 356/33, 34, 35, 114, 115; 350/160 P

[56] References Cited
UNITED STATES PATENTS
2,073,691  3/1937  Gray ..................................... 356/33
3,520,608  7/1970  Spencer ............................... 356/35

Primary Examiner—Ronald L. Wibert
Assistant Examiner—Conrad Clark
Attorney, Agent, or Firm—Sherman Levy

[57] ABSTRACT

An opthalmic lens tester is disclosed which employs a source of conventional incandescent light coupled with a reflecting dispersive prism and a pair of crossed polarizers to determine chemical or stress hardening conditions of such lenses. The tester also employs a source of "black" light to test a lens to determine if it is of the Photosun or the Photogray type.

3 Claims, 3 Drawing Figures 3,815,997

PHOTO PRISMATIQUE POLARISCOPE

SUMMARY OF INVENTION

Instruments are known which allow an opthalmic lens to be tested to determine if it has been made impact resistant by stressing the lens. These instruments illuminate the lens with polarized light and the lens is viewed through a polarizer crossed with the direction of polarization of the illuminating light. If the lens has been hardened the conventional Maltese cross will be seen.

It is also known that lenses made of glass which contain silver halide crystals change their transmission characteristics when activated by ultra-violet, or black light. These lenses are, for example, produced under the names, Photosun and Photogray, trademarks of the Corning Glass Works.

One object of the invention is to provide an apparatus for simultaneously determining if a lens has been made impact resistant and is of the Photosun or Photogray type.

Lenses may also be hardened by the sodium nitrate chemical process. The conventional hardness determining instrument described above can not determine if a lens has been treated by this process.

The present invention allows detection of such chemical hardening of a lens by using the light dispersion properties of a prism such that spectral density variations are seen when the lens has been chemically hardened.

The instrument of the invention may also serve as a comparator to determine if a lens in either Photosun or Photogray. Both of these lenses have silver halide but each will have a different shade after equal exposure to sunlight. The comparison is effected by placing in the instrument, for example, a lens on the left and a Photogray lens to the right with the unknown lens under test placed in the center between the known lenses. After equal exposure to the black light, the lens in the center may be compared for equal density to the other known lenses to determine the type.

DETAILED DESCRIPTION OF INVENTION

Figure 1:
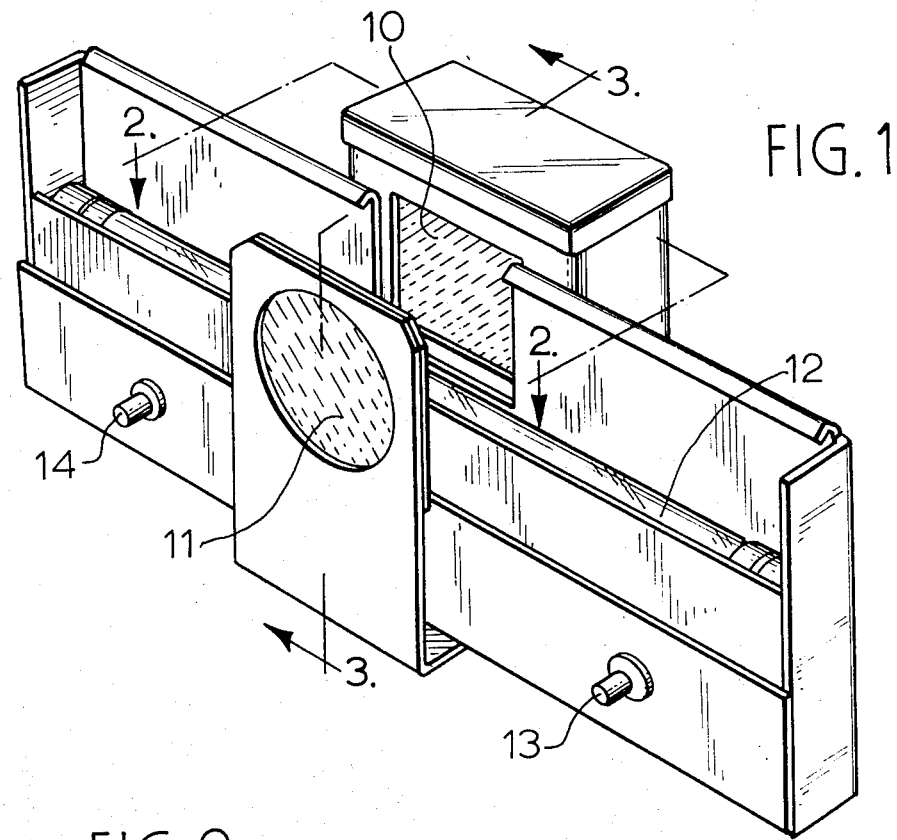
FIG. 1 is an elevational view of my novel Photo prismatique polariscope.

As seen in FIG. 1 the invention generally consists of a black light source 12, placed in a generally horizontal position and lies below two crossed polarizers 10, 11.

Figure 3:
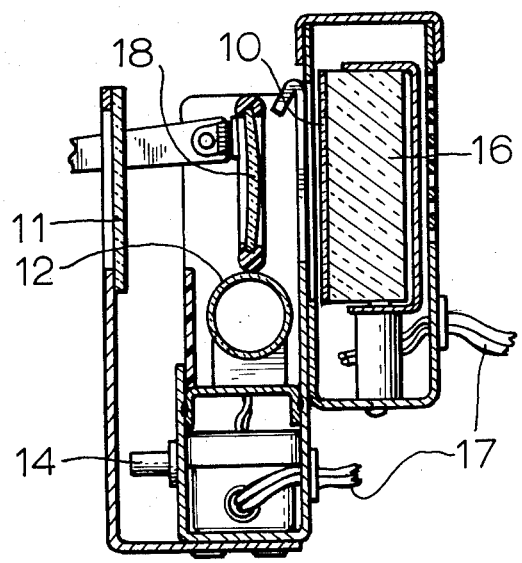
FIG. 3 is a side sectional view of FIG. 1 as seen through section 3—3.

The polarizers 10, 11, are spaced to provide room for a lens under test 18, to be placed therebetween as shown in FIG. 3.

Figure 2:
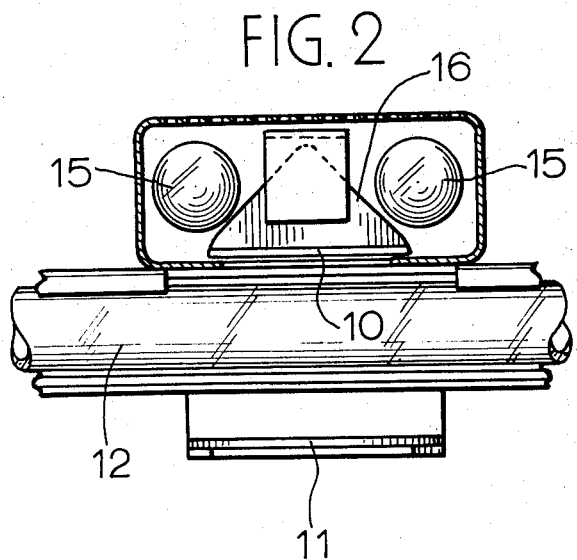
FIG. 2 is a plan view of the same photo prismatique polariscope with the top cover removed to show detail through section 2—2.

As seen in FIG. 2 light from one of the lamps 15 is directed onto the polarizer 10 by means of a prism 16. The lamps 15 and 12 are energized through the power cords 17.

Switches 13, 14 serve to control the light sources 15 and 12 respectively.

In operation lamps 15 and 12 are energized and a lens under test 18, is placed between polarizers 10, 11 so as to be simultaneously illuminated by light from both prism 16, which will be polarized by polarizer 10, and the black light from lamp 12. The operator views the lens under test 18 through polarizer 11. Known lenses of the Photosun and Photogray type, used for comparison, may be placed to the left and right of lens 18 so as to be activated by black light 12.

To test for stress hardened lenses the operator looks at the lens under test through polarizer 11 for appearance of the conventional Maltese Cross indicative of such stress hardened lenses.

Chemically hardened lenses observed through the polarizer 11 will show spectral density variations across the lens.

Photosun and Photogray lenses are determined by equal density comparison with a known Photosun or Photogray lens under equal exposure conditions as described above.

I claim:

1. In a prismatic polariscope, a supporting structure, an incandescent light source in said supporting structure, a dispersing, reflecting prism means on said supporting structure adjacent said incandescent light source for receiving light from said incandescent light source; a first polarized filter on said supporting structure contiguous to said dispersing, reflecting prism means for polarizing light from said dispersing, reflecting prism means; a second polarized filter on said supporting structure in approximately 90° axis opposition to the first polarized filter axis, and spaced from said first polarized filter; black light means on said supporting structure; light switch means for said incandescent light source and said black light means; said supporting structure supporting lenses to be viewed between said first and second polarized filters and in juxtaposition with said black light means.

2. The structure as defined in claim 1 and further including means for electrically connecting said incandescent light source and said black light means to a source of electrical energy.

3. The structure as defined in claim 1 wherein said supporting structure is constructed for supporting ophthalmic lenses of eye glasses.

* * * * *